United States Patent [19]

Dickinson

[11] 3,730,054

[45] May 1, 1973

[54] AIR MOTOR

[75] Inventor: Bryan J. Dickinson, Zenith, Wash.

[73] Assignee: FMC Corporation, San Jose, Calif.

[22] Filed: June 2, 1971

[21] Appl. No.: 149,310

[52] U.S. Cl. .................................. 91/491, 91/180
[51] Int. Cl. ........................... F01b 1/06, F01b 13/06
[58] Field of Search .................. 91/180, 503, 491, 91/492–498

[56] References Cited

UNITED STATES PATENTS

| 2,620,733 | 12/1952 | Overbeke | 91/491 |
| 2,839,033 | 6/1958 | Kersey et al. | 91/180 |
| 3,058,451 | 10/1962 | Brown | 91/180 |
| 3,354,786 | 11/1967 | Bedford | 91/180 |

Primary Examiner—Paul E. Maslousky
Attorney—F. W. Anderson et al.

[57] ABSTRACT

A driving connection between the rotary valve and crankshaft of an air motor comprising a tang on the valve and a driving groove on the crankshaft. A resiliently compressive element is provided between the valve tang and crankshaft groove to preload the valve and crankshaft outwardly against their respective supporting bearings and prevent lateral shifting of these elements due to lateral exhaust air impulses on the rotary valve. An index pin in the crankshaft groove and a corresponding pin receiving hole in the valve tang prevent 180° out of phase assembly of these elements. The pin receiving hole is sufficiently oversized to prevent any driving action by the indexing pin due to any misalignment of the valve and crankshaft axes of rotation.

7 Claims, 6 Drawing Figures

Patented May 1, 1973
3,730,054
2 Sheets-Sheet 1
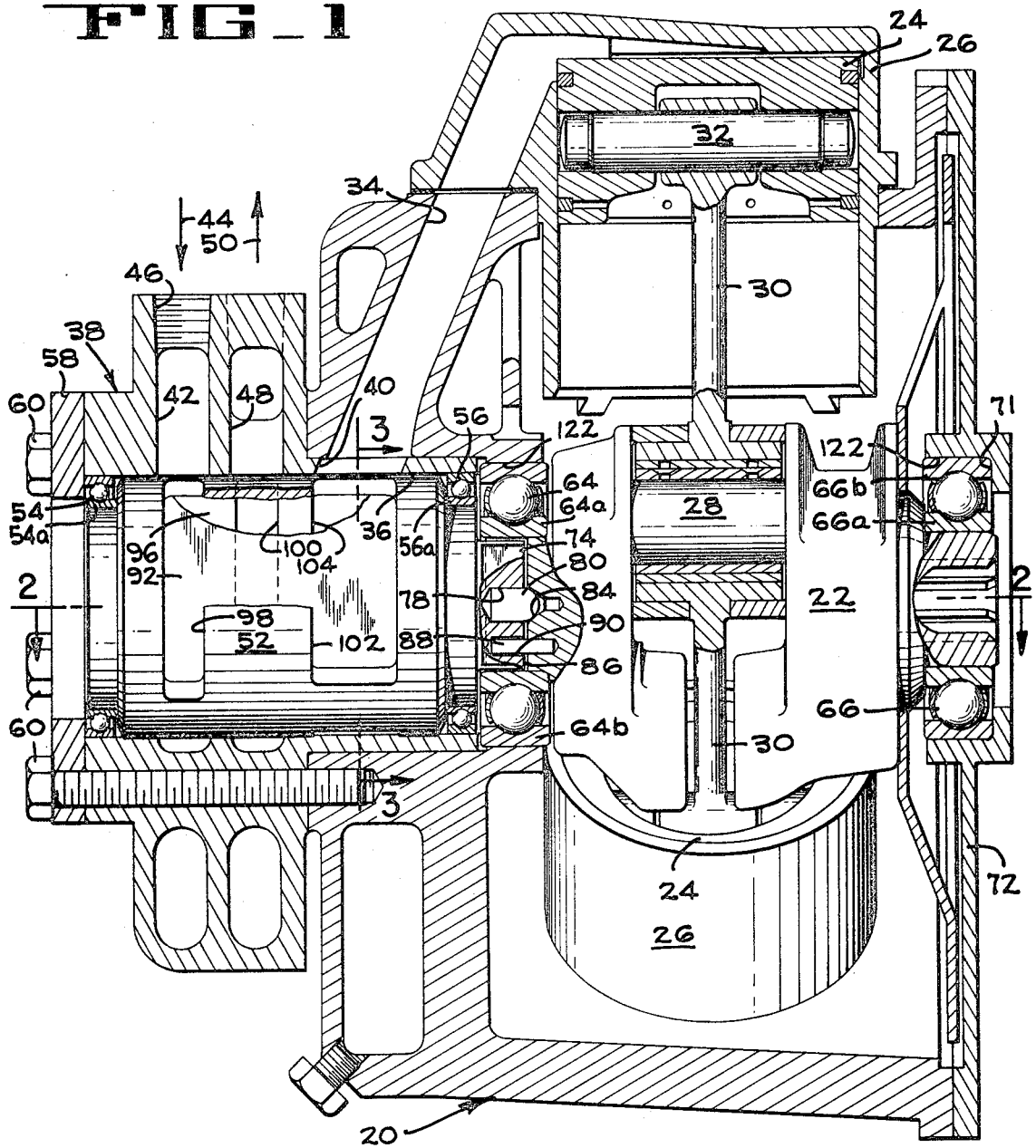
FIG_1
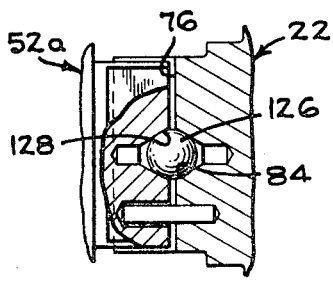
FIG_5
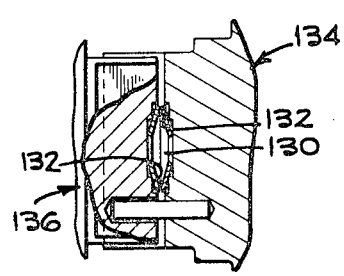
FIG_6
INVENTOR.
BRYAN J. DICKINSON
BY
ATTORNEYS

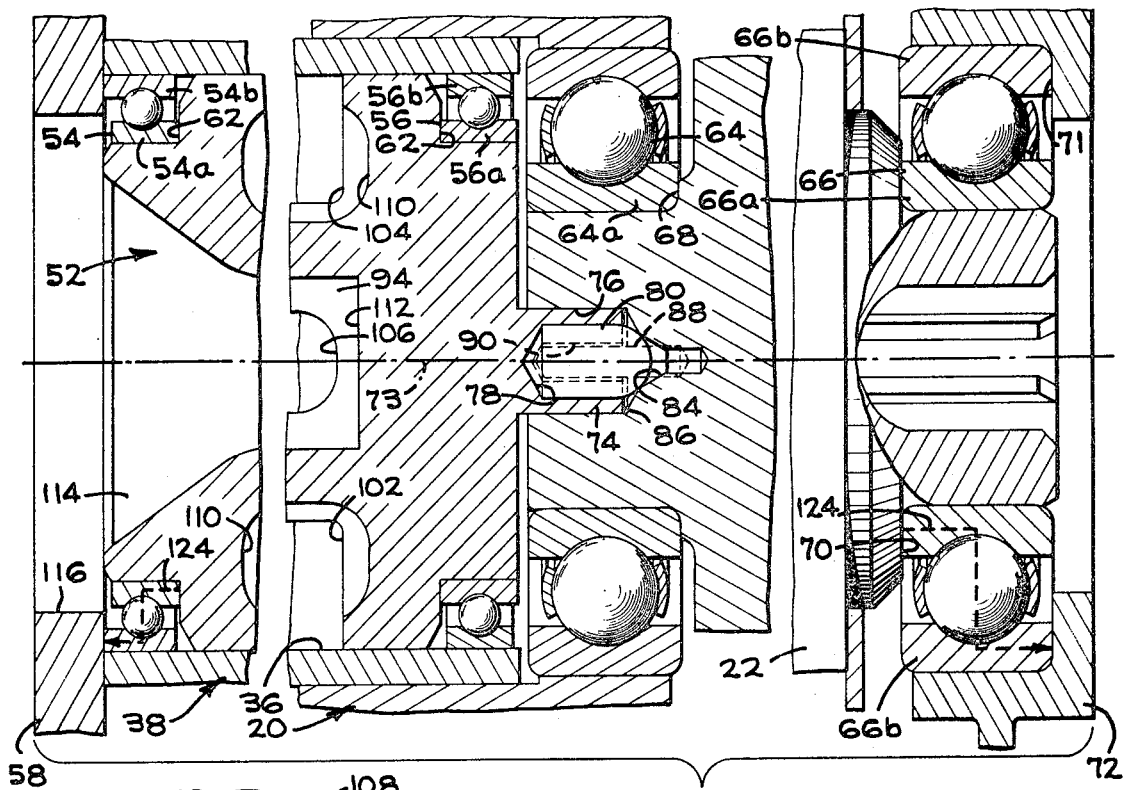
FIG_2
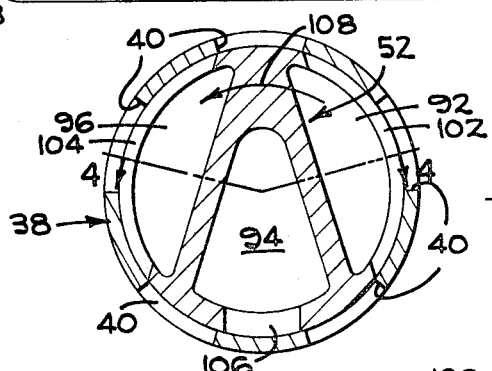
FIG_3
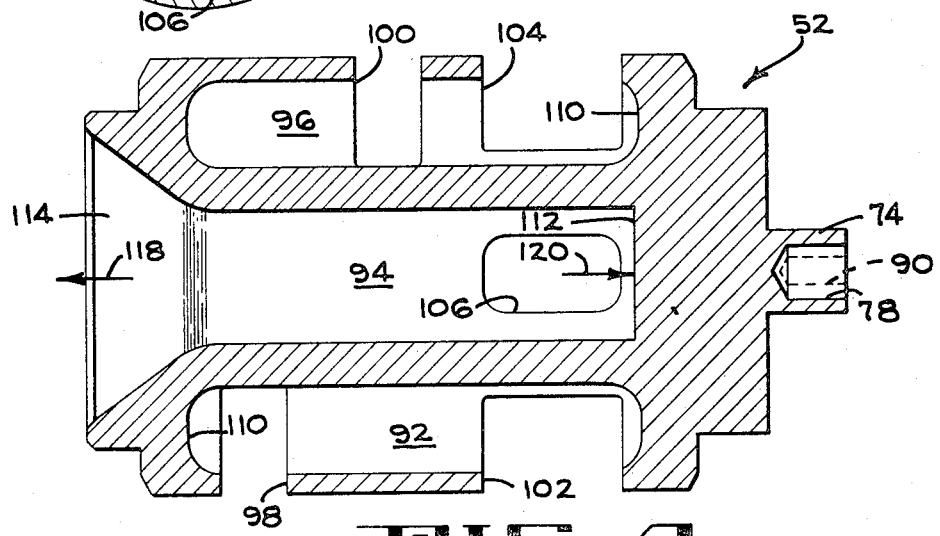
FIG_4

AIR MOTOR

BACKGROUND OF THE INVENTION

1. Field of the Invention

The present invention relates to multiple cylinder motors and in particular to an indexing and lateral force damping connection between the cylinder crankshaft and rotary valve.

2. Description of the Prior Art

Air motors of the type having a rotary valve element with an axial exhaust passage are described by Brown, U.S. Pat. No. 3,058,451 issued Oct. 16, 1962 and Gordon U.S. Pat. No. 3,306,171, which patents are incorporated herein by reference. Air motors of this type exhibit an undesirable characteristic during operation known as banging or hammering. This is caused by axial or lateral shifting of the rotary valve element against the crankshaft, bearings or housing members due to the pulsating unbalanced reaction force of air being exhausted axially from the valve. In addition to being noisy, the lateral shifting of the valve element substantially reduces the operating life of the valve and crankshaft bearings.

Attempts have been made to eliminate this problem by capturing the inner and outer races of the valve and crankshaft bearings between various close tolerance shoulders in the motor and valve housings. This method, in addition to being expensive, does not completely solve the problem since the bearings themselves permit lateral displacement between their inner and outer races.

Air motors of this type generally employ tang and groove drive connections between the rotary valve and crankshaft. In order to prevent 180° out of phase assembly of the valve and crankshaft, axially off-set tangs and drive pins are often employed. If any axial misalignment exists between the crankshaft and valve, the off-set tang or drive member transmits eccentric loads to the bearings supporting the driven valve thereby further reducing their operating life.

SUMMARY OF THE INVENTION

The present invention simply and economically solves the aforementioned valve hammering problem by providing a resiliently compressive element between the rotary valve and crankshaft to axially and outwardly preload the outer end bearings on the valve and crankshaft. This preload is sufficiently greater than the unbalanced pulsating axial reaction forces produced by the air axially exhausted from the rotary valve, eliminating shifting and hammering of the rotary valve.

An additional benefit obtained by the preload is that these elements run truer. This is especially beneficial in maintaining a seal between the rotary valve and its housing.

The transmission of eccentric driving forces from the crankshaft to the rotary valve is further precluded by employing a centrally located tang and groove drive connection. Provision of an off-set non-driving indexing pin between the valve and crankshaft insures proper assembly without inducing forces during operation.

Other benefits and advantages of the present invention will become apparent upon consideration of the following drawings and description of the invention.

DESCRIPTION OF THE DRAWINGS

FIG. 1 is a central vertical sectional view of the piston type air motor of the present invention having portions broken away.

FIG. 2 is an enlarged section taken through the crankshaft and rotary valve on line 2—2 of FIG. 1, and has portions broken away.

FIG. 3 is a sectional view through the valve and valve housing taken on line 3—3 of FIG. 1.

FIG. 4 is a sectional view through the valve taken on line 4—4 of FIG. 3.

FIGS. 5 and 6 show modified forms of the compressive element.

DESCRIPTION OF THE INVENTION

Referring to FIG. 1, the air motor of the present invention comprises a motor housing 20 that encloses a crankshaft 22 to which are affixed in the usual fashion a plurality of pistons 24, mounted to reciprocate in radially oriented cylinder housings 26. The pistons 24 are connected to a throw arm 28 of the crankshaft 22 by means of connecting rods 30 which are journalled to the throw arm 28 at one end and at the other end to wrist pins 32.

In communication with the top of each cylinder is an air passage 34 that extends through the motor housing 20 and which communicates with an interior bore 36 of a valve housing 38 through a port 40. It will be appreciated that each of the multiple cylinders 26 has a similar air passage and port 40 in communication with the bore 36 of the valve housing, the additional ports also being indicated at 40 in FIG. 3. The valve housing 38 further includes an annular passage 42 to which air pressure, indicated by arrow 44, is admitted through an inlet port 46. Adjacent thereto is a similar annular passage 48 having a port (not shown) through which air may be exhausted as shown by arrow 50.

A rotary valve 52 is individually supported within the bore of the valve housing 38 by means of deep groove roller bearings 54 and 56 at either end of the valve. In order to retain the valve 52 in the housing 38 a cover plate 58 is secured over the end of the housing by means of bolts 60 which additionally serve to retain the valve housing 38 on the motor housing 20.

Referring to FIGS. 1 and 2, the bearings 54 and 56 have inside races 54a and 56a that are press fitted on the rotary valve and abut against shoulders 62 on opposing ends of the valve. The outer races of these bearings indicated at 54b and 56b form a sliding fit with the bore 36 of the valve housing, permitting insertion or removal of the rotary valve and its bearings as a unit. It is to be further noted, that when the cover plate 58 is installed the plate abuts the outer race 54b of bearing 54.

The crankshaft is similarly supported within the housing 20 by means of deep groove roller bearings 64 and 66 press fitted on opposite ends of the crankshaft 22. Here again, the inner races of bearings 64 and 66 indicated at 64a and 66a, abut shoulders 68 and 70 on the crankshaft and the outer race 66b of bearing 66 abuts against a shoulder 71 formed in a rear cover plate 72 that encloses the rear end of the motor housing 20. The outer race 64b of the crankshaft bearing 64 is slidably received in the housing 20 while the outer race 66b is slidably received in the rear cover plate 72 of bearing 66.

The rotary valve 52 and crankshaft 22 have a common axis of rotation 73 and are drivingly connected by means of a centrally located straight sided tang 74 on the rearward portion of the valve. This tang engages a cooperating groove 76 in the forward portion of crankshaft 22 forming a free sliding fit therewith. A recess 78 is formed in the tang 74 coincident with its axis of rotation for receiving a bullet shaped resiliently compressive rubber snubber 80 having a Shore Scale A durometer in the range of 40–50. The snubber is somewhat longer than recess 78 and protrudes into a cooperating conical recess 84 that is located in the base of the crankshaft groove 76 and is coincident with axis 73.

When the crankshaft 22 and rotary valve 52 are installed with the rubber snubber 80 between them, the snubber is effective to create a separating force between the valve and crankshaft thereby shifting the valve to the left and the crankshaft to the right. As best seen in FIG. 2, this provides clearances as indicated at points 86 such that there is no longitudinal abutting contact between the valve 52 and crankshaft 22, or between bearings 56 and 64, except through the snubber 80.

The purpose of the snubber 80 is to preload bearings 54 and 66 on the outer ends of the valve and crankshaft against their respective cover plates 58 and 72, so that these bearings run somewhat on the sides of their grooves. This preloading action has the advantage that the runout of the bearings is reduced and results in reducing the eccentricity of both the valve 52 and crankshaft 22 with respect to their housings 20 and 38.

The tang and groove drive connection further includes the feature of an indexing pin 88. This pin is centrally located in the groove 76 (FIG. 2) and held in the crankshaft 22 by means of a drive fit. As seen in FIG. 1, the pin 88 is also spaced a distance below the axis of rotation 73 and is received in an oversize hole 90 (also seen in FIG. 4) in the tang 74 of the rotary valve. Therefore, the indexing pin is never a driving element between the valve and crankshaft and serves only to prevent 180° out of phase assembly of these elements. This is especially important in motors having an odd number of cylinders such as the present design.

In order to distribute air under pressure entering the inlet passage 42 of the valve housing 36 to the cylinders 26 and in turn exhaust air from these cylinders, the rotary valve is provided with an inlet chamber 92, a primary exhaust chamber 94 and a secondary exhaust chamber 96 best seen in FIGS. 3 and 4. Chambers 92 and 96 are in continuous communication with their respective annular valve housing passages 42 and 48 through ports 98 and 100 (FIGS. 1 and 4). Each of chambers 92 and 94 also have a distributor port as indicated at 102 and 104. As best seen on FIG. 3 these distributor ports effect communication in a timed relation with the several valve housing ports 40. Therefore, inlet air under pressure indicated by arrow 44 in FIG. 1, enters the annular inlet passage 42 and passes through port 98 into the inlet chamber 92 of the rotary valve 52. This air exits from chamber 92 via the distributor port 102 and is directed sequentially to the individual cylinders 26 through air passages 34 as the valve rotates in a counterclockwise direction when viewed from the valve housing end. Air is sequentially exhausted from the cylinders, but in a different phase than the introduction of air thereto. Exhaust occurs through the primary exhaust chamber 94, whenever exhaust port 106 is in communication with one of the air passages 34. Similarly, the second exhaust chamber 96 is also effective to exhaust cylinders through its distributor port 104 leading to the chamber 96 and port 100 communicating with the annular passage 48 from which air is exhausted as shown by arrow 50 in FIG. 1. Referring to FIGS. 3 and 4, it can be seen that after a particular cylinder has been subjected to inlet air under pressure through its port 40 and air passage 34, counterclockwise rotation of the rotor valve 52, as indicated by arrow 108 in FIG. 3, will bring the particular cylinder in communication with the primary exhaust passage 94 through its exhaust port 106. Thereafter, further exhausting of the air is provided by the secondary exhaust chamber 96 when its distributor port 104 comes into alignment with the same particular port 40.

Rotary valves of this type are generally well known in the art and further description of such a valve is not considered necessary to the understanding of the present invention. However, it is to be noted that if the air supply 44 and secondary exhaust 50 as seen in FIG. 1 are reversed, the air motor will operate in the reverse or clockwise direction since the valve 52 is symmetrical about a vertical axis through the primary exhaust chamber 94.

Although rotary valves such as described above are well known in the art a particular problem exists with the employment of such valves. Referring now to FIG. 4 it will be apparent that the inlet chamber 92 and the secondary exhaust chamber 96 are identically enclosed at either end as indicated at 110. Therefore, when chambers 92 and 96 are subjected to either inlet air pressure or exhaust air pressure no lateral forces are developed on the rotary valve 52. Chamber 94 differs in this respect. It's right or inner end indicated at 112 is closed while its left or outer end indicated at 114 is open to the atmosphere through an opening 116 in the valve housing cover plate 58 previously described.

Therefore, each time exhaust port 106 comes into communication with one of the valve housing ports 40 leading to the cylinders which contain highly compressed air, the air flowing out of the primary exhaust chamber 94, as indicated by arrow 118, will cause a reaction force on the enclosed inner end of the primary exhaust passage 112, this force being represented by an arrow 120. This force 120 created by the reaction of the exhaust air leaving the primary exhaust chamber occurs five times in each revolution for a five cylinder motor and forces the rotating valve element 52 to the right.

An important feature of the present invention is to prevent lateral shifting of the valve element 52 which previously resulted in hammering or banging. Assuming for the moment that the rubber snubber 80 as seen in FIG. 2 were not employed, and some clearance indicated at 86 is present between the valve element 52 and the crankshaft 22, it will become readily apparent that as the unbalanced force 120 is cyclically exerted against the valve element 52, the valve element will shift laterally within the bore 36 of the valve housing.

Since the bearings 54 and 56 which support the rotary valve and the bearings 64 and 66 which support the crankshaft are press fitted to their respective valve element and crankshaft at their inner races, the bearings including both their inner and outer races will move with the valve and crankshaft when they are subjected to lateral unbalanced forces. Since the outer races of the bearings 54, 56, 64 and 66 form a sliding fit with the bore 36 of the valve housing and a similar bore 122 in the motor housing and rear cover plate 72, the lateral shifting of the valve element and crankshaft will cause sliding motion between the outer bearing races and the bore in which they are received. This eventually results in sufficient wear on either the bore or the outer race of the bearings so that the outer races of the bearings will rotate relative to their housings and failure of the bearings occurs rapidly thereafter.

The present invention eliminates the problem of shifting of the valve body 52 and/or the crankshaft by means of the previously described rubber snubber 80 positioned between the crankshaft and rotary valve. This rubber snubber preloads the valve and crankshaft in opposite directions so that the preload force is transmitted from the valve element shoulder 62 through the bearing 54 through the valve housing cover plate 58 which contacts the outer races of the bearing 54. The path of transmission of the preload and its direction is indicated by the heavy dashed line 124 in FIG. 2. Similarly, this line shows the identical force transmission through the shoulder 70 and bearing 66 to the rear housing cover plate 72 as seen in the right of FIG. 2. The amount of preload created by the rubber snubber 80 is greater than the maximum pulsating lateral force 120 that is exerted against the valve element due to the exhaust air reaction forces in the primary exhaust chamber 94. Since this preload is not overcome by the force 120, no lateral shifting of the valve element or crankshaft can occur with respect to their housings 38 and 20, thereby eliminating the wear on the outer races of the bearings 54, 56, 64 and 66 and eliminating this source of bearing failure.

A further advantage of employing the rubber snubber is the elimination of multiple close tolerances for locating and confining the bearings to prevent lateral movement thereof, as is presently done. Lateral dimensional control therefore of the cover plate 58, valve housing 38, rotary valve 52, motor housing 20, crankshaft 22 and rear cover plate 72, as well as the associated bearing mounting shoulders, can be relaxed since the rubber snubber will take up differences created by a more open tolerance condition.

Additionally, when a roller bearing of the deep groove type, such as employed in the present invention, is laterally preloaded, the balls then run in the sides of their races and reduce the amount of run-out inherent in the bearing, resulting in increased concentricity of the rotary valve 52 and crankshaft 22 with respect to their housings. The increased concentricity of the rotating parts about axis 73 can be employed, either to provide a closer fit between the valve element 52 and the bore 36 of its valve housing or in the alternative to provide a more generous tolerance range, thereby decreasing the manufacturing costs of the motor.

FIG. 5 illustrates a modified form of the invention in which a spherical rubber ball 126 is employed as the compressible means to preload the valve and crankshaft. In this modified form, the crankshaft 22 and conical recess 84 in the base of the crankshaft groove 76 are unchanged. A rotary valve 52a is used in place of valve 52 and is identical to valve 52 except that the cylindrical cavity 78 is replaced by a conical cavity 128.

Yet another modified form of the invention is shown in FIG. 6. In this form, a pair of belleville washers 130 are received in opposed stepped cavities 132 in the tang and groove connection between a crankshaft 134 and a valve 136. The crankshaft 134 and the valve 136 are, in all other aspects, identical to the previously described crankshaft 22 and valve 52.

Although the best mode contemplated for carrying out the present invention has been herein shown and described, it will be apparent that modification and variation may be made without departing from what is regarded to be the subject matter of the invention.

What I claim is:

1. An air motor comprising a motor housing having multiple cylinders, a crankshaft, multiple pistons supported from the crankshaft for reciprocation in the cylinders, said housing including a cover plate, bearing means for supporting the crankshaft in the housing, a valve housing on the motor, rotary valve means in the valve housing for supplying and exhausting air to and from the cylinders in a timed sequence, said valve having an internal axially extending exhaust passage exiting from one end of said valve, a valve housing cover plate, bearing means for supporting said valve in the valve housing, said valve and said crankshaft having substantially aligned axes of rotation, tang and groove means for drivingly connecting said valve and said crankshaft, resiliently compressible means between said crankshaft and valve for axially preloading said crankshaft and said valve in opposite directions, said preload exerting an axial force on said valve greater than and in directional opposition to any reaction force created by air exiting from said exhaust passage, and non-driving indexing means effective between said crankshaft and valve to permit only one way connection of said tang and groove means.

2. The motor of claim 1 wherein said tang and groove are perpendicular and symmetric to the axes of rotation of said crankshaft and valve, and said indexing means comprises an indexing pin spaced from said axes receivable in a cooperating aperture in a non-driving relationship.

3. The motor of claim 1 wherein said bearing means for supporting the crankshaft in the housing includes an inner and outer anti-friction bearing and wherein said bearing means for supporting said valve in the valve housing includes an inner and outer anti-friction bearing, said anti-friction bearings having inner and outer races, and said valve and said crankshaft having outwardly facing shoulders, the inner races of said outer bearings engaging, respectively, said shoulders on said valve and crankshaft, and the outer races of said outer bearings bearing, respectively, against the motor housing cover plate and said valve housing cover plate.

4. An air motor comprising a motor housing having multiple cylinders, a crankshaft, multiple pistons supported from the crankshaft for reciprocation in the cylinders, bearing means for supporting the crankshaft in the housing, rotary valve means in the housing for supplying and exhausting air to and from the cylinders in a timed sequence, said valve having an internal axially extending exhaust passage exiting from one end of said valve, bearing means for supporting the valve in the housing, said valve and said crankshaft having substantially aligned axes of rotation, means for drivingly connecting said valve and said crankshaft, and a resilient rubber like material between said crankshaft and valve for axially preloading said crankshaft and said valve in opposite directions.

5. The motor of claim 4 wherein said resilient rubber like material is bullet shaped.

6. The motor of claim 4 wherein said resilient rubber like material has the shape of a spherical ball.

7. The motor of claim 4 wherein said resilient rubber like material has a Shore scale A durometer reading in the range of 40 to 50.

* * * * *